United States Patent
Nishikawa et al.

(10) Patent No.: US 11,759,906 B2
(45) Date of Patent: Sep. 19, 2023

(54) MACHINE TOOL

(71) Applicant: DMG MORI CO., LTD., Nara (JP)

(72) Inventors: Shizuo Nishikawa, Nara (JP);
Masahiro Shimoike, Nara (JP); Shuji Komatsu, Nara (JP); Hiroki Nakao, Nara (JP)

(73) Assignee: DMG MORI CO., LTD., Nara (JP)

( * ) Notice: Subject to any disclaimer, the term of this patent is extended or adjusted under 35 U.S.C. 154(b) by 87 days.

(21) Appl. No.: 17/045,689

(22) PCT Filed: Jan. 23, 2019

(86) PCT No.: PCT/JP2019/001983
§ 371 (c)(1),
(2) Date: Oct. 6, 2020

(87) PCT Pub. No.: WO2019/207862
PCT Pub. Date: Oct. 31, 2019

(65) Prior Publication Data
US 2021/0023669 A1    Jan. 28, 2021

(30) Foreign Application Priority Data
Apr. 23, 2018 (JP) .................. 2018-082330

(51) Int. Cl.
*B23Q 17/20* (2006.01)
*B23Q 11/14* (2006.01)
(Continued)

(52) U.S. Cl.
CPC .......... *B23Q 17/20* (2013.01); *B23Q 11/0891* (2013.01); *B23Q 11/10* (2013.01);
(Continued)

(58) Field of Classification Search
CPC ...... B23Q 11/0003–0007; B23Q 11/10; B23Q 11/126; B23Q 11/128; B23Q 11/148;
(Continued)

(56) References Cited

U.S. PATENT DOCUMENTS 2,221,127 A * 11/1940 Bates .................. B23Q 11/148
165/206
2,330,168 A *  9/1943 Zimmermann ......... B23F 23/12
409/21
(Continued)

FOREIGN PATENT DOCUMENTS

JP         S569167 A     1/1981
JP         S62203736 A   9/1987
(Continued)

OTHER PUBLICATIONS

EPO Machine Translation of JP 2009101473 A—Ikeda, N; "Temperature adjusting device for machine tool i.e. horizontal-type machining center, has sensor detecting whether room temperature is close to target temperature such that control part performs temperature control of heat exchanger"; (May 14, 2009).*
(Continued)

*Primary Examiner* — Erica E Cadugan
*Assistant Examiner* — Michael Vitale
(74) *Attorney, Agent, or Firm* — von Briesen & Roper, s.c.

(57) ABSTRACT

Provided is a machine tool (1) which is capable of measuring machining accuracy of a workpiece (W) with high accuracy and enables the time required from machining to measurement of machining accuracy to be greatly reduced. The machine tool (1) machining a workpiece (W) while moving a tool and the workpiece (W) relative to each other includes a cover (2) separating from outside a machining area for machining the workpiece (W) therein, and temperature
(Continued)

adjusting means (30) used in machining of the workpiece (W) to adjust an ambient temperature of the machining area.

2 Claims, 4 Drawing Sheets

(51) Int. Cl.
    *B23Q 11/10*     (2006.01)
    *B23Q 11/08*     (2006.01)

(52) U.S. Cl.
    CPC ..... *B23Q 11/148* (2013.01); *Y10T 409/30392* (2015.01); *Y10T 409/303976* (2015.01); *Y10T 409/304032* (2015.01); *Y10T 409/306944* (2015.01); *Y10T 409/307336* (2015.01)

(58) Field of Classification Search
    CPC .............. B23Q 17/0985; B23Q 17/099; B23Q 17/20–2291; B23Q 17/2452; B23Q 17/2471; B23B 2270/48; B23B 2270/62; B24B 41/007; B24B 55/04–057; Y10T 408/16–175; Y10T 408/44–46; Y10T 408/98; Y10T 409/303976; Y10T 409/304032; Y10T 409/306832; Y10T 409/307224; Y10T 409/308008; Y10T 409/401925

USPC ......... 451/7, 8, 449, 451–457; 409/134–136, 409/186, 188, 193, 195, 207; 408/8–13, 408/56–61, 241 G
    See application file for complete search history.

(56) References Cited

U.S. PATENT DOCUMENTS

| | | | | |
|---|---|---|---|---|
| 5,213,019 | A * | 5/1993 | Carlyle | B23Q 11/128 82/149 |
| 6,036,412 | A * | 3/2000 | Dalia | B23Q 11/1069 409/137 |
| 6,675,549 | B1 * | 1/2004 | Kaneda | B23Q 11/10 52/749.1 |
| 6,884,009 | B2 * | 4/2005 | Maeda | B23Q 7/1431 409/137 |
| 7,757,626 | B2 * | 7/2010 | Shinya | H01L 21/67178 118/667 |
| 8,079,788 | B2 * | 12/2011 | Murota | B23Q 11/0891 409/137 |
| 10,112,202 | B1 * | 10/2018 | Dichter | B04C 3/06 |
| 2005/0136821 | A1 * | 6/2005 | Handte | B23Q 11/141 454/49 |
| 2019/0339072 | A1 * | 11/2019 | Maier | B23Q 17/22 |

FOREIGN PATENT DOCUMENTS

| | | | |
|---|---|---|---|
| JP | 2003080426 A | | 3/2003 |
| JP | 2003129993 A | | 5/2003 |
| JP | 2005265700 A | | 9/2005 |
| JP | 2006192362 A | * | 7/2006 |
| JP | 2009101473 A | | 5/2009 |
| JP | 2010281565 A | | 12/2010 |
| JP | 2011143493 A | | 7/2011 |
| JP | 2013129036 A | | 7/2013 |

OTHER PUBLICATIONS

EPO Machine Translation of JPS62203736A—"Device for Regulating Temperature in Cover of Machine Tool"; Wakaoka, Shunsuke; (Sep. 8, 1987).*
International Search Report for related Application No. PCT/JP2019/001983; dated Apr. 16, 2019.

* cited by examiner

MACHINE TOOL

TECHNICAL FIELD

The present invention relates to a machine tool configured to measure machining accuracy of a workpiece.

BACKGROUND ART

A machine tool has been known which is capable of, after a series of operations for machining a workpiece (object) is finished, attaching a measurement device to a tool spindle or the like and then carrying out measurement of the workpiece with the workpiece staying in the machine tool. For instance, Patent Literature 1 (Japanese Unexamined Patent Application Publication No. 2013-129036) discloses a machine tool configured such that ultra-precision machining, cleaning, and on-machine measurement are automatically carried out by a numerical controller without intervention of an operator. In this machine tool, a working area for a driving shaft of a machining machine is previously divided into a machining area, a cleaning area, and a measurement area, and the position of the driving shaft is monitored by the numerical controller. When the driving shaft enters each area, an operation assigned to the area is automatically started and the operation is continued until the driving shaft leaves the area.

CITATION LIST

Patent Literature

[Patent Literature 1] Japanese Unexamined Patent Application Publication No. 2013-129036

SUMMARY OF INVENTION

Technical Problem

In order to accurately measure the shape of a machined workpiece, the measurement has to be performed in an ideal ambient temperature. However, the ambient temperature inside the machine tool after machining deviates from an ideal ambient temperature due to the influence of heat generated during the machining. Therefore, in order to accurately measure the shape of a workpiece, the measurement cannot be started until the ambient temperature inside the machine tool reaches an ideal ambient temperature.

However, the above-described conventional machine tool automatically judges whether to start machining, whether to start measurement, etc. on the basis of positional information indicative of which of the machining area, cleaning area, and measurement area the driving shaft belongs to; therefore, measurement of the shape of a workpiece is carried out even though the ambient temperature is very high. Therefore, positional relation between the measurement device and the workpiece cannot be kept constant, which results in inaccurate shape measurement.

The above-described conventional machine tool is able to control such that movement of the driving shaft is suspended until the very high ambient temperature reaches an ideal ambient temperature, and the driving shaft is moved to the measurement area at the time when the ambient temperature reaches the ideal ambient temperature. However, such control ultimately requires waiting for the ambient temperature to reach an ambient temperature ideal for the measurement. Consequently, the manufacturing time is made longer by this waiting time, which greatly increases the time needed for the entire manufacturing process.

The present invention has been achieved in view of the above-described circumstances. An object of the present invention is to provide a machine tool which is capable of measuring machining accuracy of a workpiece with high accuracy and enables the time required from machining to measurement of machining accuracy to be greatly reduced.

Solution to Problem

To solve the above-described problems, the present invention provides a machine tool machining a workpiece while moving a tool and the workpiece relative to each other, the machine tool including:

a cover separating from outside a machining area for machining the workpiece therein; and temperature adjusting means used in machining of the workpiece to adjust an ambient temperature of the machining area.

Because of including the temperature adjusting means for adjusting the ambient temperature of the machining area, this machine tool is able to adjust the ambient temperature of the machining area after machining the workpiece. Therefore, this machine tool is able to adjust the ambient temperature, which is high immediately after machining, to a temperature (for example, 20° C.) suitable for measuring machining accuracy of the workpiece. This enables the ambient temperature to be kept constant during measurement of machining accuracy of the workpiece after machining. Consequently, positional relation between a measurement device and a workpiece is kept constant so that highly accurate shape measurement is enabled. Further, this machine tool does not require waiting for the ambient temperature after machining to reach an ambient temperature ideal for measurement of machining accuracy of the workpiece; consequently, the time required for the entire manufacturing process is greatly reduced.

In the above-described machine tool, the temperature adjusting means may include a temperature sensor that detects the ambient temperature, a fluid spray nozzle that sprays fluid toward the workpiece, and a controller that controls, in accordance with the temperature detected by the temperature sensor, a spraying operation of the fluid spray nozzle so that the fluid is sprayed.

This machine tool includes the temperature sensor for detecting the ambient temperature of the machining area and is configured to spray fluid toward the workpiece to be machined in accordance with the temperature detected by the temperature sensor. With this machine tool, it is possible to automatically adjust the ambient temperature to a temperature ideal for measurement of machining accuracy of the workpiece when the ambient temperature is equal to or higher than a predetermined temperature at the time of measurement after machining. Consequently, an operator does not need to judge whether the ambient temperature is suitable for the measurement.

Note that the fluid used herein may be air, e.g., compressed air, or a liquid. Particularly, coolant that is generally used in machine tools may be used as the fluid.

Further, in this machine tool, the controller may be configured to control the spraying operation of the fluid spray nozzle such that the fluid is sprayed at maximum spraying quantity by the fluid spray nozzle when the temperature detected by the temperature sensor is equal to or higher than a first temperature.

In this machine tool, the fluid is sprayed at maximum spraying quantity by the fluid spray nozzle when the ambient temperature is equal to or higher than a predetermined temperature. Therefore, even if the ambient temperature reaches a very high temperature, the ambient temperature is cooled to a predetermined temperature quickly.

Alternatively, in the above-described machine tool, the temperature adjusting means may include a temperature sensor that detects the ambient temperature, an air suction device that sucks air out of the machining area, and a controller that controls, in accordance with the temperature detected by the temperature sensor, a sucking operation of the air suction device so that air is sucked out of the machining area.

This machine tool includes the temperature sensor for detecting the ambient temperature of the machining area and is configured to suck air out of the machining area in accordance with the temperature detected by the temperature sensor. With this machine tool, it is possible to automatically adjust the ambient temperature to a temperature ideal for measurement of machining accuracy of the workpiece when the ambient temperature is equal to or higher than a predetermined temperature at the time of measurement after machining. Consequently, an operator does not need to judge whether the ambient temperature is suitable for the measurement. Note that when sucking air out of the machining area, the air suction device may suck out fluid which has been sprayed into the machining area.

Further, in this machine tool, the controller may be configured to control the sucking operation of the air suction device such that air is sucked out at maximum sucking quantity by the air suction device when the temperature detected by the temperature sensor is equal to or higher than a second temperature.

In this machine tool, air is sucked out at maximum sucking quantity by the air suction device when the ambient temperature is equal to or higher than a predetermined temperature. Therefore, even if the ambient temperature reaches a very high temperature, the ambient temperature is cooled to a predetermined temperature quickly.

Moreover, in the above-described machine tool, the controller may be configured to control the spraying operation of the fluid spray nozzle such that the fluid is sprayed at maximum spraying quantity by the fluid spray nozzle when machining of the workpiece is finished.

In this machine tool, the fluid is sprayed at maximum spraying quantity by the fluid spray nozzle when machining of the workpiece is finished. Therefore, the ambient temperature is cooled to a predetermined temperature more quickly without involving detection of the ambient temperature using a temperature sensor or the like. Accordingly, the machine tool does not need to include a temperature sensor for detecting the ambient temperature. This eliminates the need for maintenance, such as damage repair, of a temperature sensor that operates under a bad, high-temperature and high-humidity environment, so that maintainability is improved.

Moreover, in the above-described machine tool, the controller may be configured to control the spraying operation of the fluid spray nozzle such that the fluid is sprayed at maximum spraying quantity by the fluid spray nozzle for a predetermined period of time starting from a time when machining of the workpiece is finished.

In this machine tool, the fluid is sprayed at maximum spraying quantity by the fluid spray nozzle for a predetermined period of time starting from a time when machining of the workpiece is finished. Therefore, the ambient temperature is cooled to a predetermined temperature more quickly without involving detection of the ambient temperature using a temperature senor or the like. Accordingly, the machine tool does not need to include a temperature sensor for detecting the ambient temperature. This eliminates the need for maintenance, such as damage repair, of a temperature sensor that operates under a bad, high-temperature and high-humidity environment, so that maintainability is improved.

Moreover, in the above-described machine tool, the controller may be configured to control the sucking operation of the air suction device such that air is sucked out at maximum sucking quantity by the air suction device for a predetermined period of time starting from a time when machining of the workpiece is finished.

In this machine tool, air is sucked out at maximum sucking quantity by the air suction device for a predetermined period of time starting from a time when machining of the workpiece is finished. Therefore, the ambient temperature is cooled to a predetermined temperature more quickly without involving detection of the ambient temperature using a temperature senor or the like. Accordingly, the machine tool does not need to include a temperature sensor for detecting the ambient temperature. This eliminates the need for maintenance, such as damage repair, of a temperature sensor that operates under a bad, high-temperature and high-humidity environment, so that maintainability is improved.

Furthermore, the above-described machine tool may further include an in-machine measurement system that measures a surface shape of the workpiece, and the controller may be configured to control such that the in-machine measurement system measures the surface shape of the workpiece when the temperature detected by the temperature sensor is equal to or lower than a third temperature.

With this machine tool, it is possible to measure the surface shape of the workpiece when the workpiece is not expanded, not when the workpiece is expanded due to high temperature. This enables the surface shape of the workpiece to be measured with high accuracy. Thus, it is possible to measure machining accuracy of the workpiece with high accuracy; consequently, quick and appropriate tool compensation based on the machining accuracy measured with high accuracy enables a predetermined machining accuracy to be successfully maintained.

Advantageous Effects of Invention

As described above, the machine tool according to the present invention is capable of measuring machining accuracy of a workpiece with high accuracy and enables the time required from machining to measurement of machining accuracy to be greatly reduced.

DESCRIPTION OF EMBODIMENTS

Hereinafter, an embodiment of the present invention will be described with reference to the drawings. In variations of the embodiment described below, components identical to those of the embodiment are denoted by the same reference sings.

Embodiment

Figure 1:
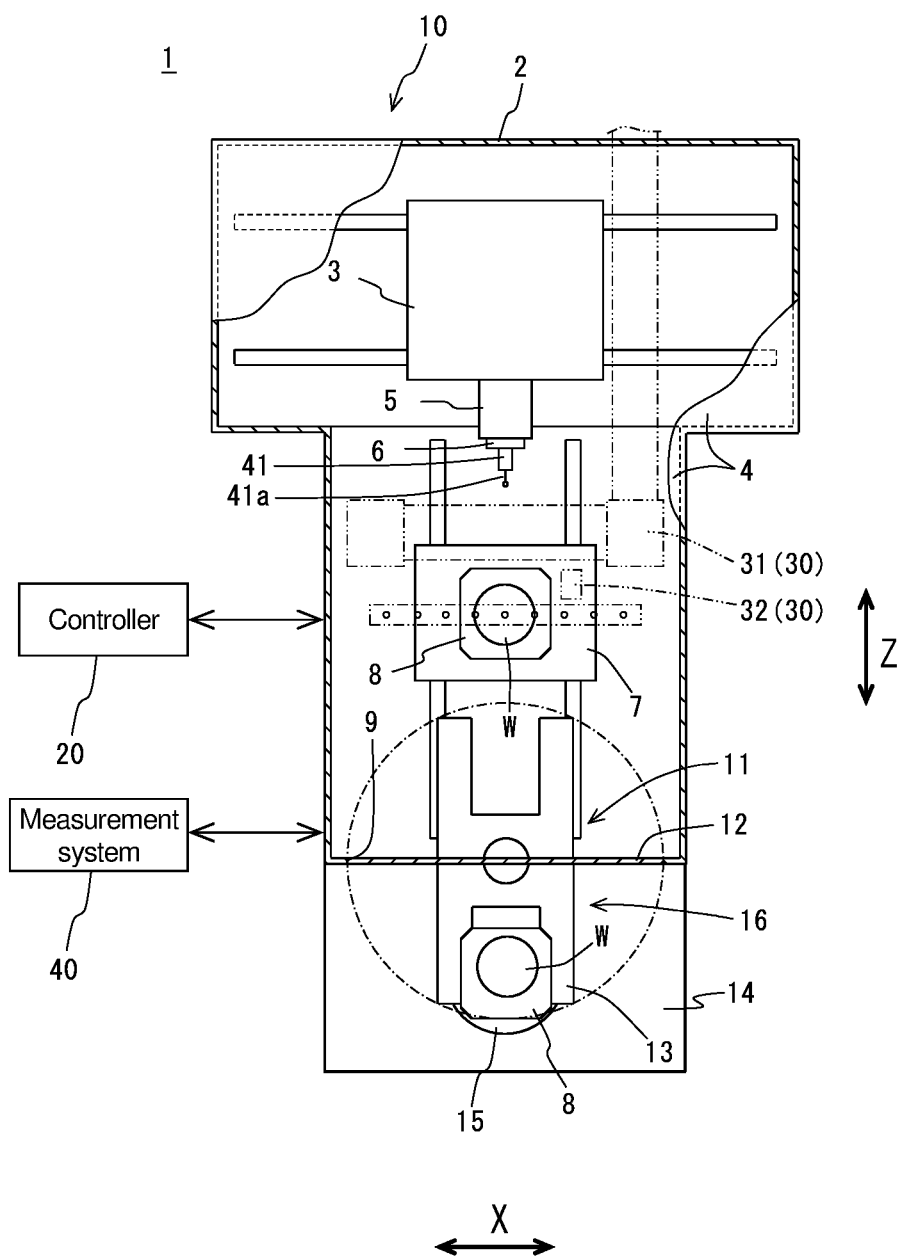
FIG. 1 is a plan view schematically illustrating a configuration of an NC machine tool according to an embodiment of the present invention.
Figure 2:
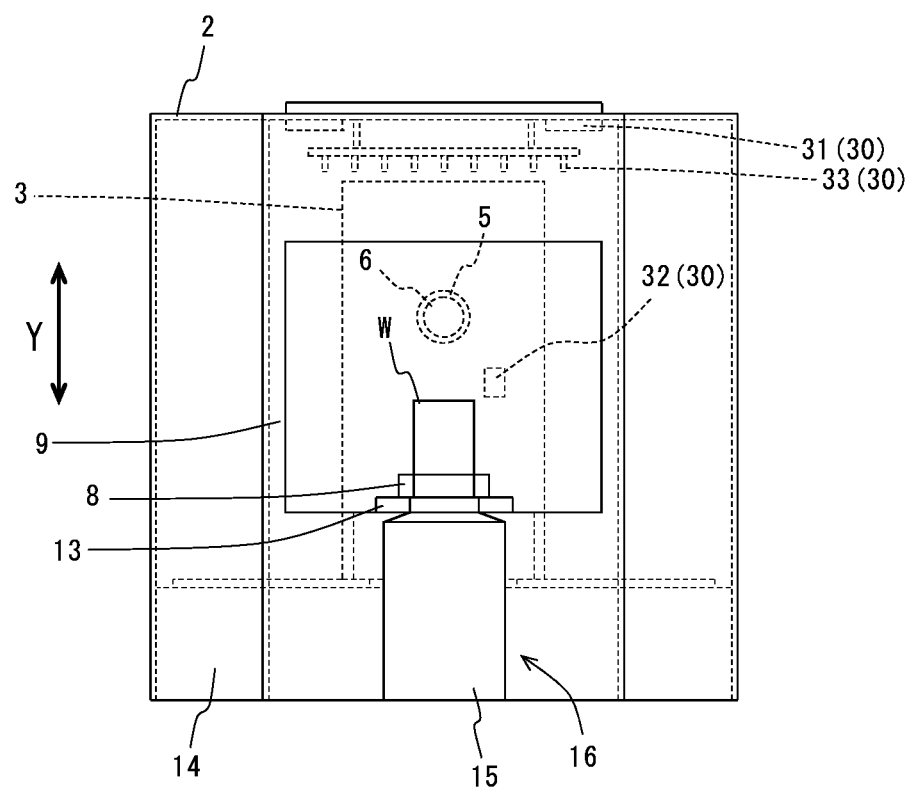
FIG. 2 is a front view of the NC machine tool illustrated in FIG. 1.

FIG. 1 is a plan view schematically illustrating a configuration of an NC machine tool 1 according to an embodiment of the present invention. FIG. 2 is a front view of the NC machine tool 1 illustrated in FIG. 1. As illustrated in FIGS. 1 and 2, the NC machine tool 1 includes an NC machine tool body 10, a pallet changer 16 that is disposed in the vicinity of the NC machine tool body 10, a cover 2 that separates from the outside a machining area for machining a workpiece W therein, feeding mechanisms (not illustrated) that move a spindle 6 and a table 7 relative to each other, a tool changer (not illustrated) that changes a tool attached to the spindle 6 with another tool, a controller 20 that operationally controls the feeding mechanisms and the tool changer, a measurement system 40 that measures machining accuracy of a machined workpiece W, and temperature adjusting means 30 that is used in machining of a workpiece W to adjust an ambient temperature of the machining area inside the cover 2.

The NC machine tool body 10 includes a bed 4, a column 3 that is disposed on the bed 4 and is movable in an X-axis direction indicated by arrow X, a spindle head 5 that is supported by the column 3 and is movable in a Y-axis direction indicated by arrow Y, the spindle 6 that holds a tool (not illustrated) and is rotatably supported by the spindle head 5, and the table 7 that is disposed on the bed 4 and is movable in a Z-axis direction indicated by arrow Z. These components are operationally controlled by the controller 20.

The table 7 is configured such that a pallet 8 is placed thereon and fixed thereto. The pallet 8 is for attaching a workpiece W thereto. The column 3, the spindle head 5, and the table 7 are moved in their respective axis directions so that a tool (not illustrated) and a workpiece W are moved relative to each other. Thereby, the workpiece W is machined.

The tool changer includes a tool magazine that stores a plurality of tools therein, and a changing mechanism that changes a tool attached to the spindle 6 with another tool stored in the tool magazine. The changing mechanism first pulls the tool out of the spindle 6 and then attaches another tool to the spindle 6.

The measurement system 40 includes a probe 41, and data processing means (not illustrated) that calculates machining accuracy of a workpiece W and outputs calculated data. The probe 41 is configured to output a contact signal to the data processing means only when a contact point 41a arranged at a distal end of the probe 41 comes into contact with a machined surface of a workpiece W.

The probe 41 is stored in the tool magazine of the tool changer and is attached to the spindle 6 by the changing mechanism to perform measurement of a workpiece W. Attaching the probe 41 to the spindle 6 allows the probe 41 to be moved in the three orthogonal axis directions by rotational motion of the spindle 6 and movement of the table 7 that has a workpiece W placed thereon, so that the contact point 41a arranged at the distal end of the probe 41 can be brought into contact with a surface of the workpiece W.

The data processing means executes calculations, such as shape measurement, regarding a machined workpiece W based on three-dimensional space positional information on the probe 41 that is moved along a machined surface of the workpiece W, and the contact signal that is output when the probe 41 comes into contact with the machined surface of the workpiece W.

Specifically, the probe 41 is moved to each predetermined measurement position, and the contact point 41a arranged at the distal end of the probe 41 is brought into contact with a machined workpiece W at the measurement position. The probe 41 outputs the contact signal when the contact point 41a comes into contact with the workpiece W. Based on this contact signal and position data on the probe 41 detected by a linear encoder (not illustrated), the data processing means (not illustrated) calculates machining accuracy of the workpiece W and outputs the calculation result.

The cover 2 is arranged along the periphery of a base 14 so as to surround the base 14 and a pallet placement table 15, and has an opening 9 for allowing a changing mechanism 11 to turn. The opening 9 is closed by a partition board 12 that is erected on a change arm 13 of the changing mechanism 11. Accordingly, the NC machine tool body 10 is provided in a space closed by the cover 2 and the partition board 12, so that coolant and chips produced during machining of a workpiece W are prevented from splashing out of the space.

The cover 2 has a workpiece port (not illustrated) formed in an appropriate portion thereof. Through this workpiece port (not illustrated), a workpiece W is removed from a pallet 8 attached on the pallet replacement table 15 and a subsequent workpiece W is attached onto the pallet 8.

The pallet changer 16 is of a turning type. The pallet changer 16 consists of the base 14 that is mounted on the bed 4, the changing mechanism 11 that is disposed on the base 14 and is able to turn, and the pallet placement table 15 that is disposed on the base 14. The changing mechanism 11 includes the change arm 13 that is configured to be able to hold pallets 8 at both ends thereof, driving means (not illustrated) composed of a drive motor or the like for causing the change arm 13 to turn, and lifting means (not illustrated) composed of a hydraulic cylinder or the like for moving up and down the change arm 13.

The change arm 13 is configured to be moved upward by the lifting means (not illustrated). When being moved upward, the change arm 13 moves while holding at both ends thereof a pallet 8 placed on the table 7 and a pallet 8 placed on the pallet placement table 15. Subsequently, the change arm 13 is turned 180° by the driving means (not illustrated), and then the change arm 13 is moved downward so that the pallets 8 held at both ends of the change arm 13 are respectively placed onto the table 7 and the pallet placement table 15. In this manner, the pallets 8 placed on the table 7 and the placement table 15 are replaced with each other by the changing mechanism 11.

The temperature adjusting means 30 includes a temperature sensor 32 that is arranged in the vicinity of the spindle 6 and detects an ambient temperature inside the machining area, a fluid splay nozzle 33 that sprays fluid toward a workpiece W placed on the table 7, and an air suction device 31 that sucks air out of the machining area. Examples of the air suction device 31 include a mist collector and a chip suction device; however, the air suction device 31 may be any device which is capable of sucking air or fluid out of the machining area.

The controller 20 controls, in accordance with the temperature detected by the temperature sensor 32, a spraying operation of the fluid spray nozzle 33 so that fluid is sprayed with a workpiece W placed on the table 7. Specifically, the controller 20 controls the spraying operation of the fluid spray nozzle 33 such that fluid is sprayed at a maximum spraying quantity by the fluid spray nozzle 33 when the temperature detected by the temperature sensor 32 is equal to or higher than a first temperature.

The controller 20 further controls, in accordance with the temperature detected by the temperature sensor 32, a sucking operation of the air suction device 31 so that air is sucked out of the machining area. Specifically, the controller 20 controls the sucking operation of the air suction device 31 such that air is sucked at maximum sucking quantity by the air suction device 31 when the temperature detected by the temperature sensor 32 is equal to or higher than a second temperature.

The operation of the NC machine tool 1 configured as described above is described below.

Once machining of a current workpiece W attached on a pallet 8 placed on the table 7 is completed, the temperature adjusting means 30 is brought into operation to adjust the ambient temperature inside the machining area. Thereby, the ambient temperature, which is high immediately after machining, is adjusted to a temperature (for example, 20° C.) suitable for measuring machining accuracy of the workpiece W. This allows the ambient temperature to be kept constant while machining accuracy of the machined workpiece W is measured. Thereby, positional relation between the contact point 41a and the workpiece W is kept constant, which enables highly accurate shape measurement. Further, since it is not necessary to wait for the ambient temperature to reach an ambient temperature ideal for measuring machining accuracy of the machined workpiece W, the time required for the entire manufacturing process is greatly reduced.

The temperature adjusting means 30 includes the temperature sensor 32 that detects the ambient temperature inside the machining area. In accordance with the temperature detected by the temperature sensor 32, fluid is sprayed toward a workpiece W to be machined. This allows the ambient temperature to be automatically adjusted to a temperature ideal for measurement of machining accuracy of the workpiece W when the ambient temperature is equal to or higher than a predetermined temperature at the time of measurement after machining. Consequently, an operator does not need to judge whether the ambient temperature is suitable for the measurement.

Specifically, when the temperature detected by the temperature sensor 32 of the temperature adjusting means 30 is equal to or higher than a first temperature, the fluid spray nozzle 33 sprays fluid at maximum spraying quantity toward the current workpiece W placed on the table 7. Thereby, the ambient temperature inside the machining area where the workpiece W is machined is cooled quickly. Further, when the temperature detected by the temperature sensor 32 is equal to or higher than a second temperature, the air suction device 31 sucks fluid, which has been sprayed into the machining area, out of the machining area at maximum sucking quantity. Thereby, the ambient temperature inside the machining area where the workpiece W is machined is cooled quickly.

Thereafter, when the temperature detected by the temperature sensor 32 is reduced to a third temperature or less, the tool changer causes the changing mechanism to attach the probe 41 of the measurement system 40, which is stored in the tool magazine, to the spindle 6. Subsequently, the measurement system 40 calculates machining accuracy of the workpiece W and outputs the calculation result. Note that the probe 41 of the measurement system 40 stored in the tool magazine is attached to the spindle 6 by the changing mechanism.

The pallet 8 placed on the table 7 is replaced with another pallet 8 placed on the pallet replacement table 15 by the changing mechanism 11. Thereby, another pallet 8 that has a subsequent workpiece W attached thereon is placed onto and fixed to the table 7, and machining of the subsequent workpiece W is started. Simultaneously, the pallet 8 having the machined current workpiece W attached thereon is placed onto the pallet placement table 15, and machining accuracy of the current workpiece W is measured by the measurement system 40.

Note that the replacement of the pallet 8 is performed by the changing mechanism 11 turning at the opening 9. Once the replacement of the pallet 8 by the turning mechanism 11 is finished, the opening 9 is closed again by the partition board 12. Accordingly, the measurement by the measurement system 40 is performed in a space closed by the cover 2 and the partition board 12, where the ambient temperature is adjusted by the temperature adjusting means 30 so that it is kept constant.

The workpiece W having been subjected to the measurement of machining accuracy by the measurement system 40 is thereafter detached from the pallet 8, and a workpiece W to be machined next is attached onto the pallet 8. Thereafter, this series of operations is repeated.

As described above, in the NC machine tool 1 according to this embodiment, the ambient temperature inside the space closed by the cover 2 and the partition board 12 is adjusted by the temperature adjusting means 30 so that it is kept constant. Therefore, the temperature of the probe 41 of the measurement system 40 and the temperature of a workpiece W placed on the pallet placement table 15 are kept constant, which allows positional relation between the probe 41 and the workpiece W to be held constant. Therefore, the probe 41 can carry out highly accurate measurement.

As described above, the NC machine tool 1 according to this embodiment is capable of measuring machining accuracy of a workpiece W with high accuracy; consequently, quick and appropriate tool compensation based on the machining accuracy measured with high accuracy enables a predetermined machining accuracy to be successfully maintained.

Furthermore, the NC machine tool 1 according to this embodiment is capable of measuring machining accuracy of a workpiece W immediately after machining of the workpiece W is finished, and the measured machining accuracy of the workpiece W can be used to adjust an amount of tool compensation and the like. Accordingly, it is possible to reflect the measurement result in the subsequent machining quickly, which enables a predetermined machining accuracy to be maintained.

(Variation 1)

Figure 3:
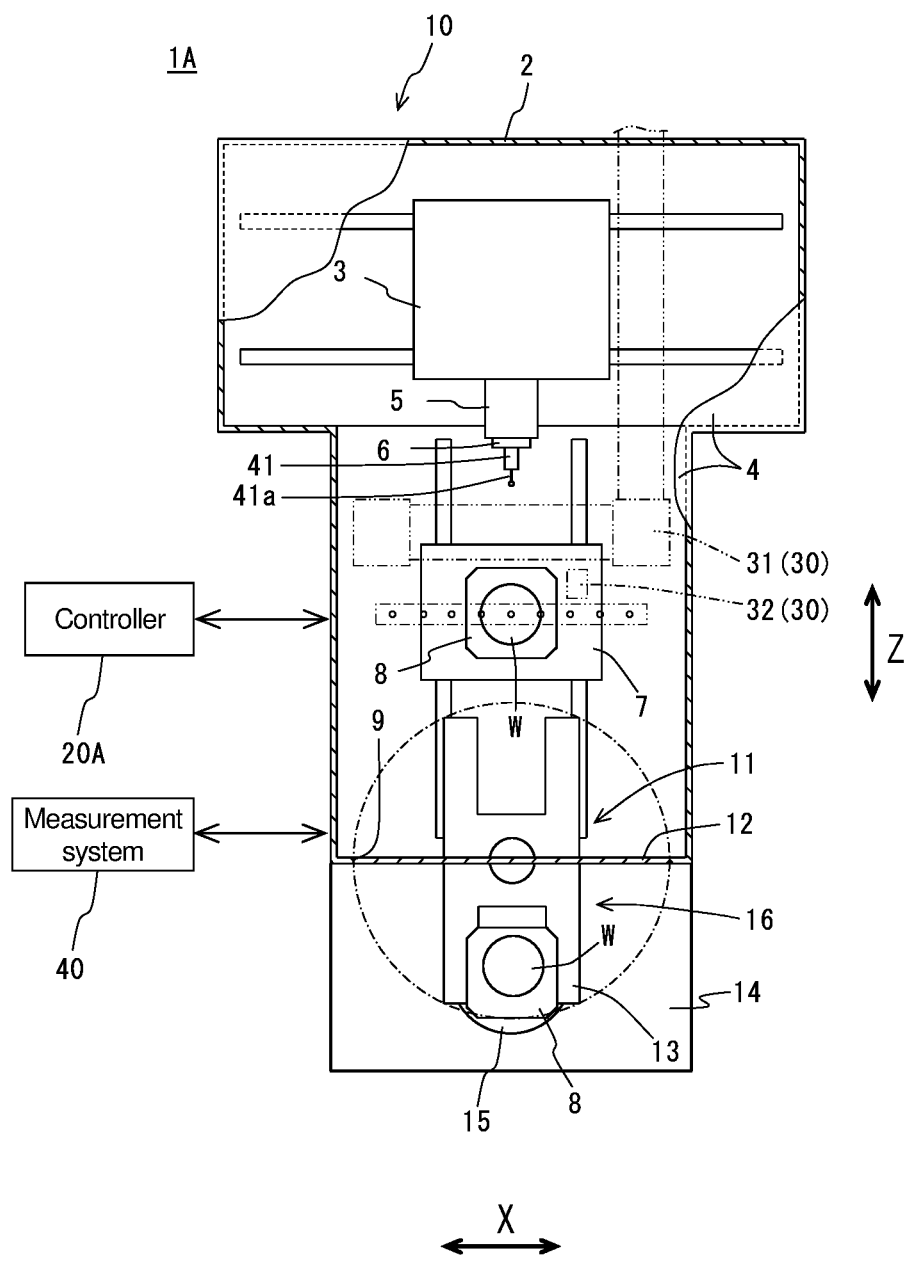
FIG. 3 is a plan view schematically illustrating a configuration of an NC machine tool according to Variation 1 of the embodiment.

FIG. 3 is a plan view schematically illustrating a configuration of a machine tool 1A according to Variation 1 of the embodiment of the preset invention. The machine tool 1A illustrated in FIG. 3 is different from the machine tool 1 illustrated in FIG. 1 in that the machine tool 1A includes a controller 20A instead of the controller 20.

The controller 20A is different from the controller 20 of the machine tool 1 illustrated in FIG. 1 in that the controller 20A controls the spraying operation of the fluid spray nozzle 33 such that fluid is sprayed at maximum spraying quantity by the fluid spray nozzle 33 when machining of a workpiece W is finished.

Accordingly, the machine tool 1A illustrated in FIG. 3 is capable of cooling the ambient temperature to a predetermined temperature more quickly than the machine tool 1 illustrated in FIG. 1. Further, the machine tool 1A does not need to include a temperature sensor for detecting the temperature inside the machine tool 1A. This eliminates the need for maintenance, such as damage repair, of a temperature sensor that operates under a bad, high-temperature and high-humidity environment, so that maintainability is improved.

Further, the controller 20A is different from the controller 20 of the machine tool 1 illustrated in FIG. 1 in that the controller 20A controls the sucking operation of the air suction device 31 such that air is sucked out at maximum sucking quantity by the air suction device 31 for a predetermined period of time starting from the time when machining of a workpiece W is finished.

Accordingly, the machine tool 1A illustrated in FIG. 3 is capable of cooling the ambient temperature to a predetermined temperature more quickly than the machine tool 1 illustrated in FIG. 1. Further, the machine tool 1A does not need to include a temperature sensor for detecting the temperature inside the machine tool 1A. This eliminates the need for maintenance, such as damage repair, of a temperature sensor that operates under a bad, high-temperature and high-humidity environment, so that maintainability is improved.

(Variation 2)

Figure 4:
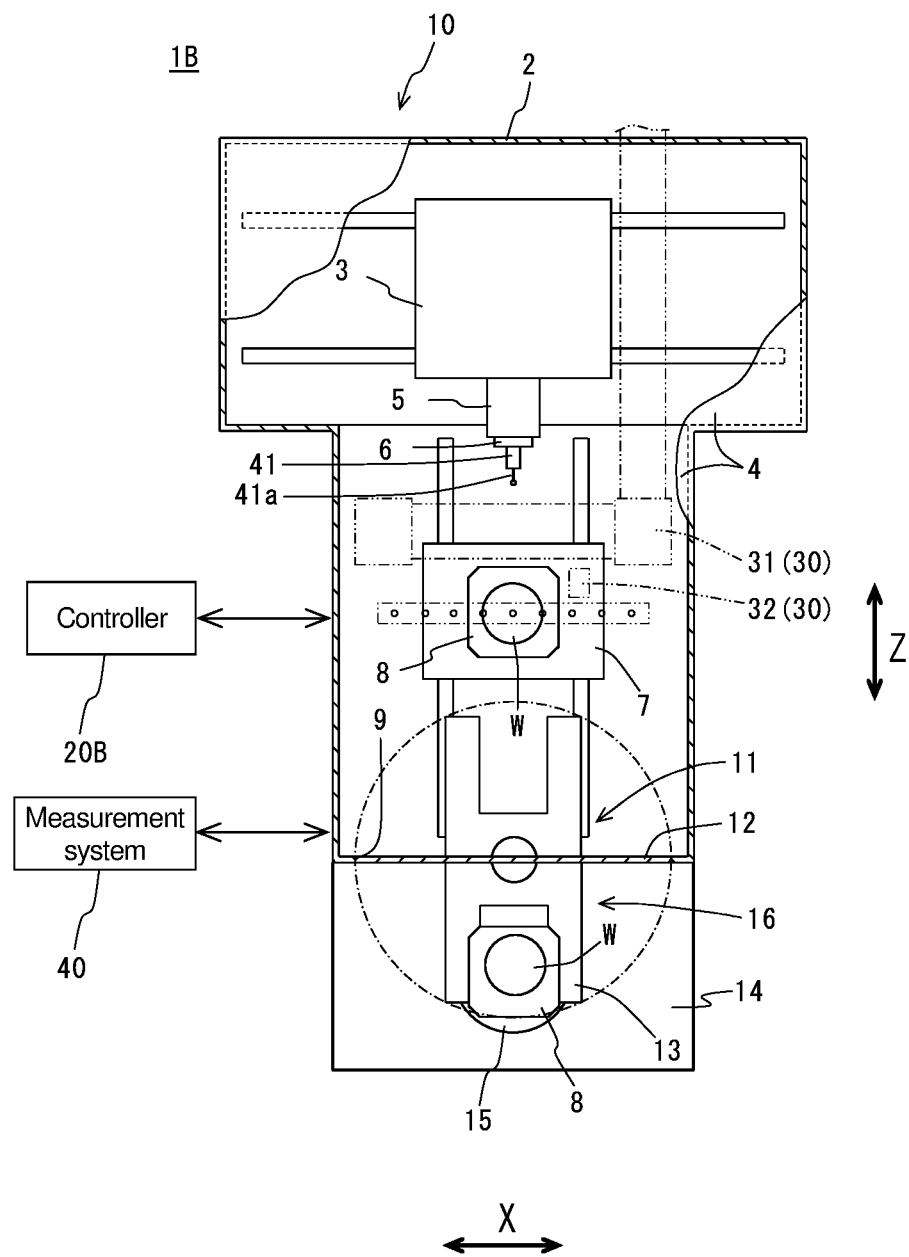
FIG. 4 is a plan view schematically illustrating a configuration of an NC machine tool according to Variation 2 of the embodiment.

FIG. 4 is a plan view schematically illustrating a configuration of a machine tool 1B according to Variation 2 of the embodiment of the preset invention. The machine tool 1B illustrated in FIG. 4 is different from the machine tool 1 illustrated in FIG. 1 in that the machine tool 1A includes a controller 20B instead of the controller 20.

The controller 20B is different from the controller 20 of the machine tool 1 illustrated in FIG. 1 in that the controller 20B controls the spraying operation of the fluid spray nozzle 33 such that fluid is sprayed at maximum spraying quantity by the fluid spray nozzle 33 for a predetermined period of time starting from the time when machining of a workpiece W is finished.

Accordingly, the machine tool 1B illustrated in FIG. 4 is capable of cooling the ambient temperature to a predetermined temperature more quickly than the machine tool 1 illustrated in FIG. 1. Further, the machine tool 1B does not need to include a temperature sensor for detecting the temperature inside the machine tool 1B. This eliminates the need for maintenance, such as damage repair, of a temperature sensor that operates under a bad, high-temperature and high-humidity environment, so that maintainability is improved.

Further, the controller 20B is different from the controller 20 of the machine tool 1 illustrated in FIG. 1 in that the controller 20B controls the sucking operation of the air suction device 31 such that air is sucked out at maximum sucking quantity by the air suction device 31 for a predetermined period of time starting from the time when machining of a workpiece W is finished.

Accordingly, the machine tool 1B illustrated in FIG. 4 is capable of cooling the ambient temperature to a predetermined temperature more quickly than the machine tool 1 illustrated in FIG. 1. Further, the machine tool 1B does not need to include a temperature sensor for detecting the temperature inside the machine tool 1B. This eliminates the need for maintenance, such as damage repair, of a temperature sensor that operates under a bad, high-temperature and high-humidity environment, so that maintainability is improved.

Note that the position at which the fluid spray nozzle 33 is arranged is not limited to the position as described in the above embodiment and variations. For example, the fluid spray nozzle 33 may be arranged at any position as long as the fluid spray nozzle 33 can spray fluid into the machining area. Further, the machine tools according to the above embodiment and variations include both the fluid spray nozzle 33 and the air suction device 31; however, the present invention is not limited to this configuration. For example, a machine tool is possible which includes either one of the fluid spray nozzle 33 and air suction device 31. Furthermore, there is no limit on the number of the fluid spray nozzle 33.

Further, the fluid sprayed by the fluid spray nozzle 33 may be air, e.g., compressed air, or a liquid. Particularly, coolant that is generally used in machine tools may be used as the fluid.

Further, examples of the machine tool include, a lathe, a milling machine, a grinding machine, and a machining center. Examples of the tool include cutting tools, such as a face mill, an end mill, a drill, and a single point tool, and grinding tools, such as a grinding wheel.

The machine tool according to the above embodiment is configured such that the opening 3 of the cover 2 is opened and closed by the partition board 125 erected on the change arm 123; however, the present invention is not limited to this configuration. For example, a configuration is possible in which the opening 3 is opened and closed by a door or the like which is movable laterally or vertically by a driving mechanism. Furthermore, the present invention is not limited to the above-described turning-type pallet changer 16, but may be applied to a shuttle-type pallet changer.

Note that each of the above-described controllers 20, 20A, and 20B is composed of a computer including a CPU, a RAM, and a ROM and is functionally implemented by a computer program stored in the computer to execute the above-described processes.

Hereinbefore, a specific embodiment of the present invention has been described. However, the present invention is not limited to the above-described embodiment and may be implemented in other manners. The foregoing description of the embodiment is illustrative in all aspects and is not limiting. One skilled in the art would be able to make variations and modifications as appropriate. The scope of the present invention is not defined by the above-described embodiment, but is defined by the appended claims. Further, the scope of the present invention encompasses changes made from the embodiment within the scope equivalent to the scope of the claims.

REFERENCE SIGNS LIST 1, 1A, 1B NC machine tool
2 Cover
3 Column
4 Bed
5 Spindle head
6 Spindle
7 Table
8 Pallet
9 Opening
10 NC machine tool body
11 Changing mechanism
12 Partition board
13 Change arm 20, 20A, 20B Controller
30 Temperature adjusting means
31 Air suction device
32 Temperature sensor
33 Fluid spray nozzle
40 Measurement system
41 Probe
41a Contact point

The invention claimed is:

1. A machine tool machining a workpiece while moving a tool and the workpiece relative to each other, wherein:
the machine tool includes:
a cover separating from outside a machining area for machining the workpiece therein;
temperature adjusting means used in machining of the workpiece to adjust an ambient temperature of the machining area; and
an in-machine measurement system measuring a surface shape of the workpiece;
the temperature adjusting means comprises:
a temperature sensor detecting the ambient temperature;
an air suction device sucking air out of the machining area; and
a controller controlling a sucking operation of the air suction device such that air is sucked out of the machining area at a sucking quantity corresponding to the temperature detected by the temperature sensor, and such that air is sucked out by the air suction device at a maximum sucking quantity in a sucking capability of the air suction device for a predetermined period of time starting from a time when the machining of the workpiece is finished; and
the controller controls such that the in-machine measurement system measures the surface shape of the workpiece when the temperature detected by the temperature sensor is equal to or lower than a measurement-allowing temperature previously determined as a temperature to allow measurement.

2. The machine tool of claim 1, wherein the controller controls the sucking operation of the air suction device such that air is sucked out at the maximum sucking quantity by the air suction device when the temperature detected by the temperature sensor is equal to or higher than a maximum-sucking temperature previously determined to cause the air suction device to suck out air at the maximum sucking quantity.

* * * * *